(12) United States Patent
Roelker et al.

(10) Patent No.: US 7,496,962 B2
(45) Date of Patent: Feb. 24, 2009

(54) INTRUSION DETECTION STRATEGIES FOR HYPERTEXT TRANSPORT PROTOCOL

(75) Inventors: Daniel J. Roelker, Arlington, VA (US); Marc A. Norton, Eldersburg, MD (US)

(73) Assignee: Sourcefire, Inc., Columbia, MD (US)

( * ) Notice: Subject to any disclaimer, the term of this patent is extended or adjusted under 35 U.S.C. 154(b) by 504 days.

(21) Appl. No.: 10/951,796

(22) Filed: Sep. 29, 2004

(65) Prior Publication Data

US 2008/0276316 A1 Nov. 6, 2008

Related U.S. Application Data

(60) Provisional application No. 60/591,870, filed on Jul. 29, 2004.

(51) Int. Cl.
*G06F 11/00* (2006.01)

(52) U.S. Cl. .............................................. 726/23

(58) Field of Classification Search ............... 726/23; 709/223
See application file for complete search history.

(56) References Cited

U.S. PATENT DOCUMENTS

| | | | |
|---|---|---|---|
| 4,570,157 A | 2/1986 | Kodaira | |
| 4,857,912 A | 8/1989 | Everett et al. | |
| 4,912,748 A | 3/1990 | Horii et al. | |
| 5,193,192 A | 3/1993 | Seberger | |
| 5,459,841 A | 10/1995 | Flora-Holmquist et al. | |
| 5,796,942 A | 8/1998 | Esbensen | |
| 5,901,307 A | 5/1999 | Potter et al. | 712/240 |
| 5,917,821 A | 6/1999 | Gobuyan et al. | |
| 5,963,942 A | 10/1999 | Igata | |
| 5,995,963 A | 11/1999 | Nanba et al. | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |

(Continued)

OTHER PUBLICATIONS

U.S. Appl. No. 10/843,353, filed May 2004, Roesch et al., System and Method for Determining Characteristics of a Network and Analyzing Vulnerabilities.

(Continued)

*Primary Examiner*—Emmanuel L. Moise
*Assistant Examiner*—Ali S Abyaneh
(74) *Attorney, Agent, or Firm*—Posz Law Group, PLC (57) ABSTRACT

A hypertext transport protocol (HTTP) inspection engine for an intrusion detection system (IDS) includes an HTTP policy selection component, a request universal resource identifier (URI) discovery component, and a URI normalization module. The HTTP policy selection component identifies an HTTP intrusion detection policy using a packet. The request URI discovery component locates a URI within the packet. The URI normalization module decodes an obfuscation within the URI. In another embodiment, a packet transmitted on the network is intercepted. The packet is parsed. An Internet protocol (IP) address of the packet is identified. An HTTP intrusion detection policy for a network device is determined. A URI is located in the packet. A pattern from an intrusion detection system rule is compared to the located URI. In another embodiment, an IDS includes a packet acquisition system, network and transport reassembly modules, an HTTP inspection engine, a detection engine, and a logging system.

23 Claims, 3 Drawing Sheets

U.S. PATENT DOCUMENTS

| | | | |
|---|---|---|---|
| 6,343,362 | B1 | 1/2002 | Ptacek et al. |
| 6,393,474 | B1 | 5/2002 | Eichert et al. |
| 6,499,107 | B1 | 12/2002 | Gleichauf et al. |
| 6,587,876 | B1 | 7/2003 | Mahon et al. |
| 6,590,885 | B1 | 7/2003 | Jorgensen |
| 6,678,824 | B1 | 1/2004 | Cannon et al. |
| 6,754,826 | B1 | 6/2004 | Challenger et al. |
| 6,772,196 | B1 | 8/2004 | Kirsch et al. |
| 6,789,202 | B1 | 9/2004 | Ko et al. |
| 6,851,061 | B1 | 2/2005 | Holland et al. |
| 6,957,348 | B1 | 10/2005 | Flowers et al. |
| 6,983,323 | B2* | 1/2006 | Cantrell et al. .............. 709/225 |
| 6,999,998 | B2 | 2/2006 | Russell |
| 7,032,114 | B1 | 4/2006 | Moran ........................ 713/187 |
| 7,065,657 | B1 | 6/2006 | Moran |
| 7,073,198 | B1 | 7/2006 | Flowers et al. ................ 726/25 |
| 7,076,803 | B2 | 7/2006 | Bruton et al. |
| 7,096,503 | B1 | 8/2006 | Magdych et al. |
| 7,113,789 | B1 | 9/2006 | Boehmke |
| 7,133,916 | B2 | 11/2006 | Schunemann |
| 7,134,141 | B2 | 11/2006 | Crosbie et al. |
| 7,152,105 | B2 | 12/2006 | McClure et al. ............. 709/224 |
| 7,257,630 | B2 | 8/2007 | Cole et al. .................. 709/224 |
| 7,305,708 | B2 | 12/2007 | Norton et al. |
| 7,310,688 | B1 | 12/2007 | Chin .......................... 709/252 |
| 7,313,695 | B2 | 12/2007 | Norton et al. |
| 7,317,693 | B1 | 1/2008 | Roesch et al. |
| 7,363,656 | B2 | 4/2008 | Weber et al. |
| 2002/0035639 | A1 | 3/2002 | Xu |
| 2002/0083344 | A1 | 6/2002 | Vairavan |
| 2002/0112185 | A1* | 8/2002 | Hodges ...................... 713/201 |
| 2002/0165707 | A1 | 11/2002 | Call |
| 2003/0014662 | A1 | 1/2003 | Gupta et al. |
| 2003/0065817 | A1 | 4/2003 | Benchetrit et al. |
| 2003/0083847 | A1 | 5/2003 | Schertz et al. |
| 2003/0093517 | A1* | 5/2003 | Tarquini ..................... 709/224 |
| 2003/0101353 | A1 | 5/2003 | Tarquini et al. ............. 713/200 |
| 2004/0034773 | A1 | 2/2004 | Balabine et al. |
| 2004/0123153 | A1 | 6/2004 | Wright et al. |
| 2004/0193943 | A1 | 9/2004 | Amgelino et al. |
| 2004/0268358 | A1 | 12/2004 | Darling et al. |
| 2005/0005169 | A1 | 1/2005 | Kelekar |
| 2005/0044422 | A1 | 2/2005 | Cantrell et al. |
| 2005/0108393 | A1* | 5/2005 | Banerjee et al. ............. 709/225 |
| 2005/0113941 | A1 | 5/2005 | Li et al. |
| 2005/0114700 | A1* | 5/2005 | Barrie et al. ................ 713/201 |
| 2005/0160095 | A1 | 7/2005 | Dick et al. |
| 2005/0172019 | A1 | 8/2005 | Williamson et al. |
| 2005/0188079 | A1 | 8/2005 | Motsinger et al. |
| 2005/0268331 | A1 | 12/2005 | Le et al. |
| 2005/0268332 | A1 | 12/2005 | Le et al. |
| 2006/0174337 | A1 | 8/2006 | Bernoth |
| 2006/0265748 | A1 | 11/2006 | Potok |
| 2006/0294588 | A1 | 12/2006 | Lahann et al. |
| 2007/0288579 | A1 | 12/2007 | Schunemann |
| 2008/0168561 | A1 | 7/2008 | Durie et al. |

OTHER PUBLICATIONS

U.S. Appl. No. 10/843,373, filed May 2004, Roesch et al., Systems and Methods for Identifying the Services of a Network.
U.S. Appl. No. 10/843,374, filed May 2004, Roesch et al., System and Methods for Determining Characteristics of a Network Based on Flow Analysis.
U.S. Appl. No. 10/843,375, filed May 2004, Roesch et al., Systems and Methods for Determining Characteristics of a Network and Assessing Confidence.
U.S. Appl. No. 10/843,398, filed May 2004, Roesch et al., Systems and Methods for Determining Characteristics of a Network.
U.S. Appl. No. 10/843,459, filed May 2004, Roesch et al., Systems and Methods for Determining Characteristics of a Network and Enforcing Policy.
U.S. Appl. No. 10/898,220, filed Jul. 2004, Norton et al., Methods and Systems for Multi-Pattern Searching.
U.S. Appl. No. 11/272,033, filed Nov. 2005, Dempster et al., Systems and Methods for Identifying the Client Applications of a Network.
U.S. Appl. No. 11/272,034, filed Nov. 2005, Vogel, III et al., Systems and Methods for Modifying Network Map Attributes.
U.S. Appl. No. 11/272,035, filed Nov. 2005, Gustafson et al., Intrusion Event Correlation with Network Discovery Information.
U.S. Appl. No. 11/493,934, filed Jul. 2006, Roesch et al., Device, System and Method for Analysis of Fragments in a Fragment Train.
U.S. Appl. No. 11/501,776, filed Aug. 2006, Roesch et al., Device, System and Method for Analysis of Segments in a Transmission Control Protocol (TCP) Session.
U.S. Appl. No. 11/711,876, filed Feb. 2007, Sturges et al., Device, System and Method for Timestamp Analysis of Segments in a Transmission Control Protocol (TCP) Session.
U.S. Appl. No. 11/785,609, filed Apr. 2007, Norton et al., Methods and Systems for Multi-Pattern Searching.
U.S. Appl. No. 11/905,980, filed Oct. 2007, Roesch, Device, System and Method for Use of Micro-Policies in Intrusion Detection/Prevention.
U.S. Appl. No. 12/010,900, filed Jan. 2008, Norton et al., Methods and Systems for Multi-Pattern Searching.
U.S. Appl. No. 12/149,196, filed Apr. 2008, Rittermann, Real-Time User Awareness for a Computer Network.
U.S. Appl. No. 12/230,338, filed Aug. 2008, Sturges et al., Speed and Memory Optimization of Intrusion Detection System (IDS) and Intrusion Prevention System (IPS) Rule Processing.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
T. Ptacek, et al., "Insertion, Evasion and Denial of Service: Eluding Network Intrusion Detection", Jan. 1998, pp. 1-63.
N. Chase, "Active Server pp. 3.0 from Scratch" (Dec. 1999), Searching for products section, 13 pp.
B. Krishnamurthy, "Web Protocols and Practice," (May 1, 2001), pp. 518-520.
U. Shankar and V. Paxson, *Active Mapping: Resisting NIDS Evasion Without Altering Traffic*, Proc. IEEE Symposium on Security and Privacy. May 2003, pp. 1-18.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
Norton et al., "Multi-Pattern Search Engine Aho-Corasick State Machine" (Mar. 17, 2004), Version 2.0, 36 pp.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.
"toupper()—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from http://www.snort/org/docs/stream5-model AUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
Office Action issued by the U.S. Patent Office on Jul. 16, 2007 in connection with related U.S. Appl. No. 10/898,220.

Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0—1244, which corresponds to related U.S. Appl. 11/493,934.
European Search Report issued by the European Patent Office on Dec. 27, 2007 in connection with European patent application No. 07015003.2—2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584. which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Notification of Transmittal of the Interntional Search Report and the Written Opinion of the International Searching Authority, or the Declaration mailed Dec. 5, 2007 in corresponding PCT Patent Application No. PCT/US05/25583.
Office Action issued on Feb. 5, 2008 in connection with the related U.S. Appl. No. 10/843,375.
Spitzner, Lance; Passive Fingerprinting, May 3, 2003; FOCUS on Intrusion Detection; pp. 1-4; obtained from http://www.ctillhq.com/pdfdb/000183/data.pdf.
Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

* cited by examiner

INTRUSION DETECTION STRATEGIES FOR HYPERTEXT TRANSPORT PROTOCOL

CROSS-REFERENCE TO RELATED APPLICATION

This application claims the benefit of U.S. Provisional Patent application Ser. No. 60/591,870 filed Jul. 29, 2004, which is herein incorporated by reference in its entirety.

BACKGROUND OF THE INVENTION

1. Field of the Invention

Embodiments of the present invention relate to methods and systems for detecting hypertext transport protocol attacks and hypertext transport protocol intrusion detection evasions from packets observed on a network. More particularly, embodiments of the present invention relate to systems and methods for associating a Web server hypertext transport protocol intrusion detection policy with a network device, decoding universal resource identifiers from network packets based on the Web server hypertext transport protocol intrusion detection policy, and decoding obfuscations within the universal resource identifiers based on the Web server hypertext transport protocol intrusion detection policy.

2. Background Information

A typical intrusion detection system (IDS) reads a network packet, decomposes the packet into one or more application protocols, and compares stored patterns known to constitute network or computer attacks to the data contained in the one or more application protocols. Usually, the stored patterns are character strings, which are directly compared to the characters of the protocol data.

Hypertext transport protocol (HTTP) is an application protocol that IDSs must examine. HTTP is used primarily to communicate between Web clients and Web servers. Encoding schemes are used extensively in HTTP. These encoding schemes convert character representations from one form to another. These encoding schemes are used for many different reasons. Some encoding schemes are used to distinguish certain characters of special meaning in HTTP. Others are used to reduce the amount of traffic sent between Web clients and Web servers. In addition, not all of the encoding schemes used in HTTP communication are standardized. For example, an encoding scheme may be unique to a particular Web server developed by a particular vendor.

As a result, the encoding schemes used in HTTP present a significant problem for an IDS. The IDS cannot simply compare its patterns directly to the HTTP data. If the IDS does, an attacker can avoid detection by using an HTTP encoding scheme to hide all or a portion of the menacing pattern. Using an HTTP encoding scheme to hide a menacing pattern is called an HTTP IDS evasion.

HTTP IDS evasions have been popular since a web scanner, called whisker, was first released to the public. Many of the original HTTP IDS evasions were contained in that first release of whisker. These evasions included using multiple slashes to obfuscate directories and inserting "HTTP/1.0" in the universal resource locator (URL) to evade an algorithm that an IDS might use to find the URL in a packet.

In addition to the evasions that whisker presented, there were other types of HTTP obfuscations that were propagated. One evasion was obfuscating a URL. This evasion was accomplished by using an absolute URL instead of a relative URL. While these other types of evasions were important, they were not as evasive or popular as the basic whisker scans.

Another popular evasion came about with the public release of an eight bit Unicode transformation format (UTF-8) encoding exploit for the Microsoft™ Internet Information Services (IIS) Web server. In addition to being a vulnerability for IIS, this encoding exploit also presented an encoding method for URLs in a way that had not been implemented in IDSs. Up until this exploit, most IDSs had instituted safeguards against the previous whisker evasions of ASCII encoding and directory traversal, but did not protect against UTF-8 encoding of Unicode code points.

Other types of HTTP IDS evasions have utilized HTTP protocol properties. One of these evasions used the property of request pipelining. Another evasion used the content-encoding header to encode HTTP request parameters in a request payload.

In view of the foregoing, it can be appreciated that a substantial need exists for systems and methods that can advantageously allow IDSs to identify HTTP IDS evasions that utilize HTTP encoding schemes or HTTP protocol parameters.

BRIEF SUMMARY OF THE INVENTION

One embodiment of the present invention is an HTTP inspection engine for an IDS. The HTTP inspection engine includes an HTTP policy selection component, a request universal resource identifier (URI) discovery component, and a URI normalization module.

The HTTP policy selection component identifies a Web server HTTP intrusion detection policy using a packet parsed by the IDS. A Web server HTTP intrusion detection policy is identified by using an Internet protocol address obtained from a packet parsed by the IDS as a key to a keyword trie that associates Internet protocol addresses with Web server HTTP intrusion detection policies. The Web server HTTP intrusion detection policy is used for the packet inspection. The Web server HTTP intrusion detection policy includes but is not limited to universal resource identifier parsing instructions and universal resource identifier decoding instructions.

The request URI discovery component locates a URI in a packet parsed by the IDS. The method used to locate the URI is based on a Web server HTTP intrusion detection policy identified by the HTTP policy selection component. The request URI discovery component also determines if the URI needs to be decoded. The URI is located using one pass inspection technology that reads through the HTTP application data one time. Locating the URI and determining if the URI needs to be decoded by reading through the HTTP application data one time is accomplished through the use of a state machine, for example.

The URI normalization module decodes an obfuscation within the URI located by the request URI discovery component. An obfuscation is an encoding of a URL field uniquely recognized by a Web server identified by the HTTP policy selection component, for example. An obfuscation is decoded using decoding methods including but not limited to hex decoding, double percent hex decoding, double nibble hex decoding, first nibble hex decoding method, second nibble hex decoding, eight bit Unicode transformation format decoding, eight bit Unicode transformation format bare byte decoding, Microsoft™ %U decoding, and mismatch decoding. An obfuscation is also decoded using one pass inspection technology that reads through the HTTP application data one time. Decoding an obfuscation by reading through the HTTP application data one time is accomplished through the use of a state machine, for example.

Another embodiment of the present invention is a method for detecting an HTTP evasion on a network using an IDS. A packet transmitted on the network is intercepted. A packet is an unassembled packet (e.g., a packet taken off the wire) or an assembled packet (e.g., a packet assembled from packets taken off the wire). The packet is parsed. An Internet protocol address of the packet is identified. A Web server HTTP intrusion detection policy for a network device located at the Internet protocol address is determined. The Web server HTTP intrusion detection policy includes but is not limited to URI parsing instructions and URI decoding instructions. The network device includes but is not limited to a Web client and a Web server. A URI is located from the packet based on the Web server HTTP intrusion detection policy. The URI is located using one pass inspection technology that reads through the packet HTTP application data one time. Locating the URI by reading through the HTTP application data one time is accomplished through the use of a state machine, for example. A pattern from a rule of the IDS is compared to the located URI. Finally, a match between the pattern from a rule of the IDS and the located URI is identified as the HTTP evasion.

In another embodiment of this method, the Web server HTTP intrusion detection policy for the network device is determined by using the Internet protocol address of the packet as a key to a keyword trie that associates Internet protocol addresses with Web server HTTP intrusion detection policies. The Web server HTTP intrusion detection policy of the network device is the HTTP intrusion detection policy of the IP address found from the packet.

In another embodiment of this method, an obfuscation is decoded within a URI based on the Web server HTTP intrusion detection policy associated with the packet. The obfuscation is decoded using decoding methods including but not limited to hex decoding, double percent hex decoding, double nibble hex decoding, first nibble hex decoding method, second nibble hex decoding, eight bit Unicode transformation format decoding, eight bit Unicode transformation format bare byte decoding, Microsof™ %U decoding, and mismatch decoding. The obfuscation is decoded using one pass inspection technology that reads through the HTTP application data one time. Decoding the obfuscation by reading through the HTTP application data one time is accomplished through the use of a state machine, for example. The obfuscation is an encoding of a URL field uniquely recognized by a Web server of the network device, for example. At least one pattern from a rule of the IDS is compared to the obfuscation. Finally, a match between the at least one pattern from a rule of the IDS and the obfuscation is identified as the HTTP evasion In another embodiment of this method, one or more additional URIs embedded in the packet are identified. At least one pattern from a rule of the IDS is compared to the one or more additional URIs. One or more matches between the at least one pattern from a rule of the IDS and the one or more additional URIs are identified as one or more HTTP evasions.

In another embodiment of this method, a match between a pattern from a rule of the IDS and a URI is recorded.

Another embodiment of the present invention is an IDS including a packet acquisition system, a network protocol reassembly module, a transport protocol reassembly module, an HTTP inspection engine, a detection engine, and a logging system. The packet acquisition system intercepts a packet transmitted across a network and parses the packet. The network protocol reassembly module parses network protocols from the packet. The transport protocol reassembly module parses transport protocols from the packet. The HTTP inspection engine parses HTTP from the packet, determines an HTTP intrusion detection policy for the packet, locates a URI within the parsed packet based on the Web server HTTP intrusion detection policy, and decodes an obfuscation within the URI based on the Web server HTTP intrusion detection policy. The detection engine receives HTTP inspected packet information from the HTTP inspection engine and inspects the HTTP inspected packet information for intrusions. The logging system receives and stores intrusion detection information from the detection engine.

As described above, the present invention is applicable to IDSs, such as those described in the related co-pending U.S. patent application Ser. No. 10/793,887, filed Mar. 8, 2004, titled "Methods and Systems for Intrusion Detection," by Marc A. Norton and Daniel J. Roelker, which is herein incorporated by reference in its entirety.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

I. IDS HTTP Protocol Analysis

In order for an IDS to handle URL attacks, the IDS must inspect the HTTP URL field for malicious attacks. The two most popular IDS inspection methodologies are pattern matching and protocol analysis. Currently, these two methodologies behave similarly, because each methodology must search for malicious URLs and this search entails some form of pattern matching and some form of HTTP protocol analysis.

Originally, there were differences between the pattern matching methodology and the protocol analysis methodology. The protocol analysis methodology only searched the URL field of the HTTP stream for malicious URLs, while the pattern matching methodology searched the whole packet for malicious URLs.

The two methodologies performed similarly until the malicious URLs started to be encoded and obfuscated. At that point, the protocol analysis methodology had to add the appropriate decoding algorithms to the URL field. HTTP protocol decoding had already been built into the pattern matching engine. But the pattern matching methodology had no way of determining which part of the packet to decode or normalize. The pattern matching methodology had to incorporate some form of protocol analysis to find the URL field so that it could apply the appropriate decoding algorithms. A form of HTTP protocol analysis was added to the pattern matching methodology and the two methodologies once again began to behave similarly.

Because of the current similarities in these IDS methodologies, the HTTP IDS evasions that are discussed here apply to both IDS inspection methodologies. The first general IDS evasion is invalid protocol parsing. For example, if the HTTP URL is not found correctly, then the malicious URLs will not be detected if they are encoded. In other words, if the IDS does not find the URL, it cannot decode it.

The second general IDS evasion is invalid protocol field decoding. If the URL is found correctly, the IDS must know the proper decoding algorithms in order to decode the fields of the URL. Otherwise, the URL will again be decoded incorrectly.

A. Invalid Protocol Parsing

URIs or URLs are located within a packet using HTTP protocol parsing. IDS evasions that use invalid protocol parsing are demonstrated by the scanner whisker and by a program called SideStep. The difference between these two programs is that whisker uses flawed IDS protocol parsing to evade detection, where SideStep uses valid aspects of application layer protocols to evade IDSs that have implemented naïve protocol parsers. As revealed by whisker and SideStep, invalid protocol parsing evasions are particularly effective against two HTTP protocol fields, the URL and the URL parameters.

For example, if the IDS HTTP parser assumes that there is only one URL per HTTP request packet, then if two URLs are sent in one packet, the IDS does not parse the second URL correctly. This is called a request pipelining evasion.

B. Invalid Protocol Field Decoding

Invalid protocol field decoding tests an IDS's ability to decode or normalize a plurality of encoding schemes available in a specific protocol field. In the case of HTTP, this is most clearly seen in the URL field. An IDS can be tested for compliance to HTTP request for comment (RFC) encoding standards and also against the unique encoding types for different web servers, like IIS. If the IDS cannot decode certain types of URL encoding, then the attacker will use these encodings to bypass detection of malicious URLs.

Another method of invalid protocol field decoding for HTTP is through directory obfuscation. Directory obfuscation is accomplished through the manipulation of directory properties. For example, "/cgi-bin/phf" could be manipulated using multiple slashes instead of one slash, or it could use directory traversals to obfuscate the exact directory path.

Directory obfuscation can only obscure a malicious URL if the IDS looks for a URL that includes at least one directory besides the file to access. In the "/cgi-bin/phf" directory example, obfuscation will work if the IDS is looking for the "phf" file in the "cgi-bin" directory. However, if the IDS is looking for just the "phf" file, the directory obfuscation would not work, since there is no directory path in that particular content.

The two general IDS evasions introduced above are discussed below in more detail under corresponding headings.

II. Invalid Protocol Parsing

A. URL Evasion Using Request Pipelines

The request pipeline evasion is a type of invalid protocol parsing evasion. It obscures the URI by using the protocol characteristics of a request pipeline in version 1.1 of the HTTP protocol.

The request pipeline standard allows a Web client to send several requests within a single packet. This is different from and should not be confused with the HTTP keep alive header. Request pipelines send several requests all in one packet, where the HTTP keep alive header keeps the TCP stream open for more requests.

The request pipeline feature is used to embed several URLs in one packet. Most IDSs will parse the first URL correctly, but fail to parse the other URLs. This leaves an avenue for evasion, because the other URLs can now be encoded. Any content matches looking for malicious URLs will fail, because the IDS did not decode the additional URLs.

For example, the following payload uses request pipelining to evade URL detection:

GET/HTTP/1.1\r\nHost: \r\n\r\nGET \foorbar.html\r\nHost: \r\n\r\nGET /cgi %2Dbin %2Fph %66HTTP/1.1\r\nHost:\r\n B. Parameter Evasion Using POST and Content-Encoding Another common HTTP protocol field that contains malicious data or attacks is the URL parameter field. The URL parameter field is the field where most database and common gateway interface (CGI) attacks occur. Most IDSs contain signatures to detect malicious parameter keys and values.

A way to evade an IDS is to encode the URL field parameters as the URL is encoded. However, most IDSs already apply URL decoding methods to the parameter field as well.

Another method of evasion is to use a POST request to move the parameter field to the end of the HTTP request header section. At this point, the parameter field is in plaintext and an IDS can easily pick out malicious content here. Instead, using the header option in content-encoding, the parameter field is encoded using base64 encoding. The parameter field is sent across the network in encoded form. The IDS not only needs to parse the POST request correctly, but it needs to decode the parameter field using base64 before inspecting the parameter field.

If the IDS actually were to decode the parameter field in a POST request with base64, the decoding effort would be very time consuming. It would also lend itself to a DOS attack by sending many POST requests with large parameter fields that would need to be decoded.

III. Invalid Protocol Field Decoding

URL obfuscation starts out with the various types of encoding methods that HTTP servers accept. Most of the encoding types are attributed to the IIS Web server, but every type of encoding should be tested against each HTTP server.

If an IDS cannot decode an encoded type for a Web server, then the IDS cannot determine whether or not a URL is malicious. Both pattern matching and protocol analysis methodologies have this problem.

There are only two RFC standards for encoding a Request URI. These standards are hex encoding and UTF-8 encoding. These two standards are encoded using the '%' character to escape each encoded byte. It should also be noted that these are the only two URL encoding types that the Apache Web Server accepts. Other encoding types that allow URL obfuscations are server specific and non-RFC compliant. The IIS Web server allows non-RFC compliant encoding types.

A. Hex Encoding

The hex encoding method is one of the RFC compliant ways for encoding a URL. It is also the most common method of encoding a URL. The encoding method consists of escaping a hexadecimal byte value for the encoded character with a '%' character. If a capital 'A' (ASCII map hexadecimal value of '0x41') is to be encoded, the encoding would be as shown below:

%41='A'

B. Double Percent Hex Encoding

Double percent hex encoding is based on the normal method of hex encoding. The '%' is encoded using hex encoding followed by the hexadecimal byte value to be encoded. To encode a capital 'A', the encoding is as shown below:

%2541='A'

The '%' is encoded with the '%25'. The value is then decoded again with the value, in this example, being '%41' (this equals the 'A'). This encoding is supported by the IIS Web server.

C. Double Nibble Hex Encoding

Double nibble hex encoding is based on the standard hex encoding method. Each hexadecimal nibble value is encoded using the standard hex encoding. For example, to encode a capital 'A', the encoding would be as shown below:

%%34%31='A'

The normal hex encoding for 'A' is '%41'. The hexadecimal nibble values are each encoded in the normal hex encoding format. So, the first nibble, '4', is encoded as '%34' (the ASCII value for the numeral '4'), and the second nibble, '1', is encoded as '%31' (the ASCII value for the numeral '1').

In the first pass of URL decoding, the nibble values are translated into the numerals '4' and '1'. Since the '4' and '1' are preceded by a '%', the second pass recognizes '%41' and decodes '%41' as a capital A. This encoding is supported by the IIS Web server.

D. First Nibble Hex Encoding

First nibble hex encoding is very similar to double nibble hex encoding. The difference is that only the first nibble is encoded. A capital 'A', instead of being encoded as '%%34%31' for double nibble hex, is encoded using first nibble hex encoding as shown below:

%%341='A'

As before, during the first pass of URL decoding, the '%34' is decoded as the numeral '4', which leaves '%41' for the second pass. During the second pass, the '%41' is decoded as a capital 'A'. This encoding is supported by the IIS Web server.

E. Second Nibble Hex Encoding

Second nibble hex encoding is the same as first nibble hex encoding, except the second hexadecimal nibble value is encoded with normal hex encoding. A capital 'A' is encoded as shown below:

%4%31='A'

The '%31' gets decoded to a numeral '1' in the first pass of decoding, and then the '%41' gets decoded in a second pass as a capital 'A'. This encoding is supported by the IIS Web server.

F. UTF-8 Encoding

UTF-8 encoding allows values larger than a single byte (0-255) to be represented in a byte stream. HTTP web servers use UTF-8 encoding to represent Unicode code points that are outside of the ASCII code point range (1-127).

UTF-8 works by giving special meaning to the high bits in a byte. A two and three byte UTF-8 sequence is illustrated below:

110xxxxx 10xxxxxx (two byte sequence)

1110xxxx 10xxxxxx 10xxxxxx (three byte sequence)

The first byte in a UTF-8 sequence is the most important, because it signifies how many bytes are in the complete UTF-8 sequence. The number of bytes in the complete sequence is determined by counting the high bits up to the first zero. In the two byte sequence example, the first byte contains two high bits set followed by a zero. This signifies a two-byte UTF-8 sequence. The rest of the bits after the zero in the first UTF-8 byte are bits in the final value to be computed.

UTF-8 bytes following the initial byte all have the same format of setting the high bit followed by a zero. Two bits are used to identify a UTF-8 byte, and six bits are used in computing the value.

To encode UTF-8 in the URL, the UTF-8 sequence is escaped with a '%' for each byte. A UTF-8 encoded character is illustrated as shown below:

%C0%AF='/'

UTF-8 encoding is used to encode Unicode code point values. Code point values are usually contained in the range 0-65535. Any code point value above 127 uses UTF-8 encoding in HTTP URLs.

Unicode code point values from 0-127 map one to one with ASCII values. This leaves approximately 65408 values to represent other characters in languages like Hungarian or Japanese.

Usually these languages have their own Unicode code page that represents the characters that they need. Unicode code point values are derived from Unicode code pages. Each Unicode code page can have a unique set of values. Thus, as Unicode code pages change, so do the characters that a Unicode code point represents. If the wrong code page is used to interpret Unicode code points, then the results are invalid. This concept is important in URL encoding.

There are three characteristics of using UTF-8 encoding to represent Unicode code points that lend themselves to confusion among IDSs. The first characteristic is that UTF-8 can encode a single code point or ASCII value in more than one way. This has been fixed in the current Unicode standard, but is still prevalent in some Web servers (excluding Apache). For example, a capital 'A' is encoded in a two byte UTF-8 sequence as shown below:

%C1%81 (11000001 10000001=1000001='A')

The capital 'A' is also be encoded in a three-byte UTF-8 sequence as:

%E0%81%81 (11100000 10000001 10000001=1000001='A')

Thus, using UTF-8 to encode ASCII characters leads to more than one representation.

The second characteristic is that some non-ASCII Unicode code points also map to ASCII characters. For example, the Unicode code point '12001' could map to a capital 'A'. The only way to determine which code points map to ASCII characters is to either read the Unicode code map or test all the different Unicode code points against a server. Currently, the only Web server that is known to do this mapping is the IIS Web server.

The third characteristic is related to the second characteristic. If the Unicode code map is changed or is not known, then interpreted Unicode code points are invalid. This is important because IIS Web servers in, for example, China, Japan, and Poland use different code pages. If an IDS is not aware of which code page a Web server is running, then the URL decoding efforts of UTF-8 are invalid. If an IDS is not configurable as to what Unicode code pages to run for particular servers, then any Web server that does not run the code page that the IDS has knowledge of is evadable.

G. UTF-8 Bare Byte Encoding

UTF-8 bare byte encoding is the same as UTF-8 encoding except that the UTF-8 byte sequence is not escaped with a '%'. The byte sequence is sent with the actual bytes. If a capital 'A' was sent across the network, it would be represented as shown below:

0xC1 0x81='A'

This type of encoding is only known to run on the IIS Web server.

H. Microsoft™ %U Encoding

Microsoft™ %U encoding presents a different way to encode Unicode code point values up to 65535 (or two bytes). In this format, '%U' precedes four hexadecimal nibble values that represent the Unicode code point value. The format is illustrated below:

%UXXXX

For example, a capital 'A' could be encoded as:

%U0041='A'

This encoding is supported by the IIS Web server.

I. Mismatch Encoding

Mismatch encoding uses different encoding types to represent an ASCII character and is not a unique encoding by itself. Mismatch encoding combines various types of encoding to encode a single character.

For example, a capital 'A' is encoded using the Microsoft %U encoding method. However, since the IIS Web server will perform a double decode on a URL, another method can be used to encode the '%U.' For example, the 'U' can be encoded with normal hex encoding. Thus, '%U0041' becomes '%%550041.' Further, '0041' can be encoded in normal hex encoding or another type of encoding.

A more complex encoding mismatch that works with an IIS Web server is shown below:

%U0025%550%303%37='7'

IV. HTTP Inspection Engine

Figure 1:
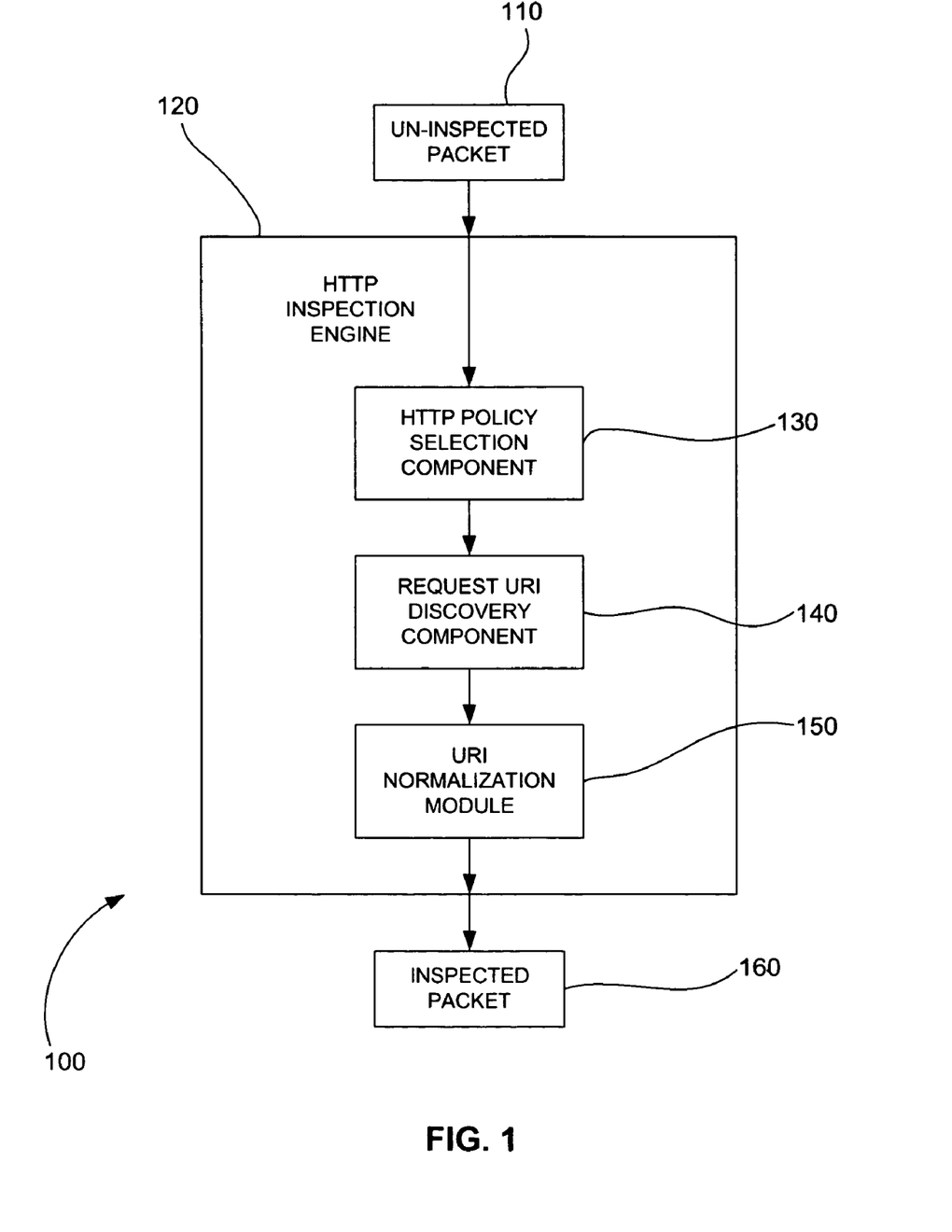
FIG. 1 is a schematic diagram showing the components of an exemplary HTTP inspection engine for an IDS, in accordance with an embodiment of the present invention.

FIG. 1 is a schematic diagram showing the components of an exemplary HTTP inspection engine 120 for an IDS 100, in accordance with an embodiment of the present invention. In system 100, HTTP inspection engine 120 includes HTTP policy selection component 130, request URI discovery component 140, and URI normalization module 150. Un-inspected packet 110 is obtained by HTTP inspection engine 120 from the IDS. It would be inefficient to inspect all packets received by the IDS for HTTP application data. As a result, HTTP inspection engine 120 is designed to initially identify packets moving to and from Web servers. This identification is accomplished by determining if there is a Web server HTTP intrusion detection policy associated with un-inspected packet 110.

HTTP policy selection component 130 attempts to identify a Web server HTTP intrusion detection policy from un-inspected packet 110. HTTP policy selection component 130 searches for a Web server HTTP intrusion detection policy using an Internet protocol address obtained from un-inspected packet 110 as a key to a keyword trie identifying Internet protocol addresses with Web server HTTP intrusion detection policies. The Web server HTTP intrusion detection policy is used for the inspection of un-inspected packet 110. The Web server HTTP intrusion detection policy includes but is not limited to URI parsing instructions and URI decoding instructions.

Once un-inspected packet 110 has been associated with a Web server HTTP intrusion detection policy, request URI discovery component 140 attempts to locate a URI within un-inspected packet 110. A URI is located based on the Web server HTTP intrusion detection policy identified for un-inspected packet 110. A URI in a packet typically has the following form:

METHOD<space>URI?PARAMETERS<space>HTTP/x.x<CR><LF>

An exemplary method of locating the URI is a state machine approach. This state machine approach involves first searching for the first whitespace delimiter ("<space>"). If no whitespace delimiters are found, the state is "within the URI." The URI is then read. If the first whitespace is found, the URI is also moved to the "within the URI" state. The URI is then processed up until the second whitespace delimiter ("<space>") or the HTTP delimiter ("HTTP/x.x<CR><LF>"), whichever appears first. If there is no second delimiter, then the remainder of the packet is assumed to be part of the URI. All other states are "outside of the URI."

Not all Web servers require whitespace delimiters. Some Web servers recognize tabs as delimiters also. Also, not all Web servers recognize the HTTP delimiter ending with a carriage return ("<CR>") and line feed ("<LF>"). Some Web servers recognize the HTTP delimiter ending with just a ("<LF>"). URI discovery component 140 selects the appropriate parsing method based on the Web server HTTP intrusion detection policy identified by HTTP policy selection component 130.

Because a state machine method is used to parse the packet, the URI is located by reading through the HTTP application data in the packet one time. At the same time that the HTTP application data is read, URI discovery component 140 determines if the URI needs to be decoded. URI discovery component 140 determines if the URI needs to be decoded by searching for encoded characters in the URI such as '%'.

If a URI has been located by URI discovery component 140 and the HTTP intrusion detection policy provides instructions on decoding obfuscations, then URI normalization module 150 attempts to decode an obfuscation within the URI located by request URI discovery component 140. An obfuscation is an encoding of a URL field recognized by a Web server identified by HTTP policy selection component 130, for example. URI normalization module 150 decodes obfuscations detected by URI discovery component 140, including encoded characters and directory traversals.

An obfuscation is decoded using a state machine, for example. Consequently, the obfuscation is found by reading through the HTTP application data one time. A state machine approach consists of looking for a backslash ("\"), forward slash ("/"), percent ("%"), and non-ASCII characters (0x80-0xFF). If one of these characters is found, then URI normalization module 150 enters the state machine, otherwise the next character is processed. If a backslash or forward slash is found, URI normalization module 150 enters a "DIRECTORY" state and tracks the location of the directory in the buffer. If a dot (".") is encountered immediately after the "DIRECTORY" state transition, URI normalization module 150 enters a "DIRECTORY_TRAVERSAL1" state. If a backslash or forward slash is encountered while in "DIRECTORY" state (normalizes multiple slashes to one slash), URI normalization module 150 remains in this state. Otherwise, the state reverts back to normal state.

If a dot is found immediately after the "DIRECTORY_TRAVERSAL1" state, URI normalization module 150 transitions to a "DIRECTORY TRAVERSAL2" state. If a forward slash or backslash is found in the "DIRECTORY_TRAVERSAL1" state, a self-directory traversal has been found and URI normalization module 150 normalizes the directory back to the last forward slash. Otherwise, the state reverts back to normal state.

If a forward slash or backslash is found immediately after the "DIRECTORY_TRAVERSAL2" state, a directory traversal has been found and URI normalization module 150 normalizes the directory back two directory locations. Otherwise, the state reverts back to the normal state.

If a percent character is found, URI normalization module 150 enters a "DECODE" state. If an additional percent character is encountered, URI normalization module 150 transitions to a "DOUBLE_DECODE" state. If URI normalization module 150 encounters a non-hex character in the "DECODE" state, URI normalization module 150 enters an "INVALID_DECODE" state. If URI normalization module 150 encounters an upper or lower case 'u', URI normalization module 150 enters a "U_ENCODING" state. Otherwise, URI normalization module 150 proceeds in the "DECODE" state and continues to the next character. Once URI normalization module 150 has processed two normal characters in the "DECODE" state, URI normalization module 150 calculates the value of the decoded hex character.

If the value of the decoded hex character, while in the "DECODE" state is a percent, URI normalization module 150 transitions to the "DOUBLE_DECODE" state. If the value of the decoded hex character is non-ASCII, then URI normalization module 150 transitions to a "UTF_8" state. If URI normalization module 150 is in the "DOUBLE_DECODE" state, URI normalization module 150 continues as if in the "DECODE" state, but cannot transition to either the "UTF_8" or "DOUBLE_DECODE" states. Instead, a percent character or a non-ASCII character places URI normalization module 150 in the "INVALID_DECODE" state.

If URI normalization module 150 is in the "U_ENCODING" state, URI normalization module 150 reads the next four characters. If any of these characters are not hex characters (0-9,a-z,A-Z), then URI normalization module 150 enters the "INVALID_DECODE" state. Otherwise, URI normalization module 150 calculates the value of the hex characters and compares that value against the initialized Unicode values. If there is a match, then URI normalization module 150 decodes the character to the mapped byte value. If there is no match, the URI normalization module 150 enters the "INVALID_DECODE" state. If the mapped byte value is equal to a percent, URI normalization module 150 enters the "DOUBLE_DECODE" state.

If URI normalization module 150 is in the "UTF_8" state or URI normalization module 150 finds a non-ASCII character when URI normalization module 150 is in the normal state (starting state), URI normalization module 150 inspects the calculated value for adherence to the UTF-8 encoding format. If the value is a valid UTF-8 encoding, then URI normalization module 150 continues in decoding the following bytes using the "DOUBLE_DECODE" routine. If URI normalization module 150 encounters either the "INVALID_DECODE" state from the "DOUBLE_DECODE" routine or the decoded character does not adhere to the UTF-8 encoding format, URI normalization module 150 transitions to the "INVALID_DECODE" state. Otherwise, URI normalization module 150 compares the value against the initialized Unicode values. If there is a match, the URI normalization module 150 decodes the character to the mapped byte value. If there is no match, URI normalization module 150 enters the "INVALID_DECODE" state. If URI normalization module 150 transitions to the "INVALID_DECODE" state, URI normalization module 150 normalizes the decoded character to a known value that indicates that an invalid decoding is in the data buffer.

Methods used to decode an obfuscation include but are not limited to hex decoding, double percent hex decoding, double nibble hex decoding, first nibble hex decoding, second nibble hex decoding, UTF-8 decoding, UTF-8 bare byte decoding, Microsoft™ %U decoding, and mismatch decoding, examples of which are described above.

With the obfuscation decoded, inspected packet 160 exits URI normalization module 150 and returns to the IDS for further processing.

Figure 2:
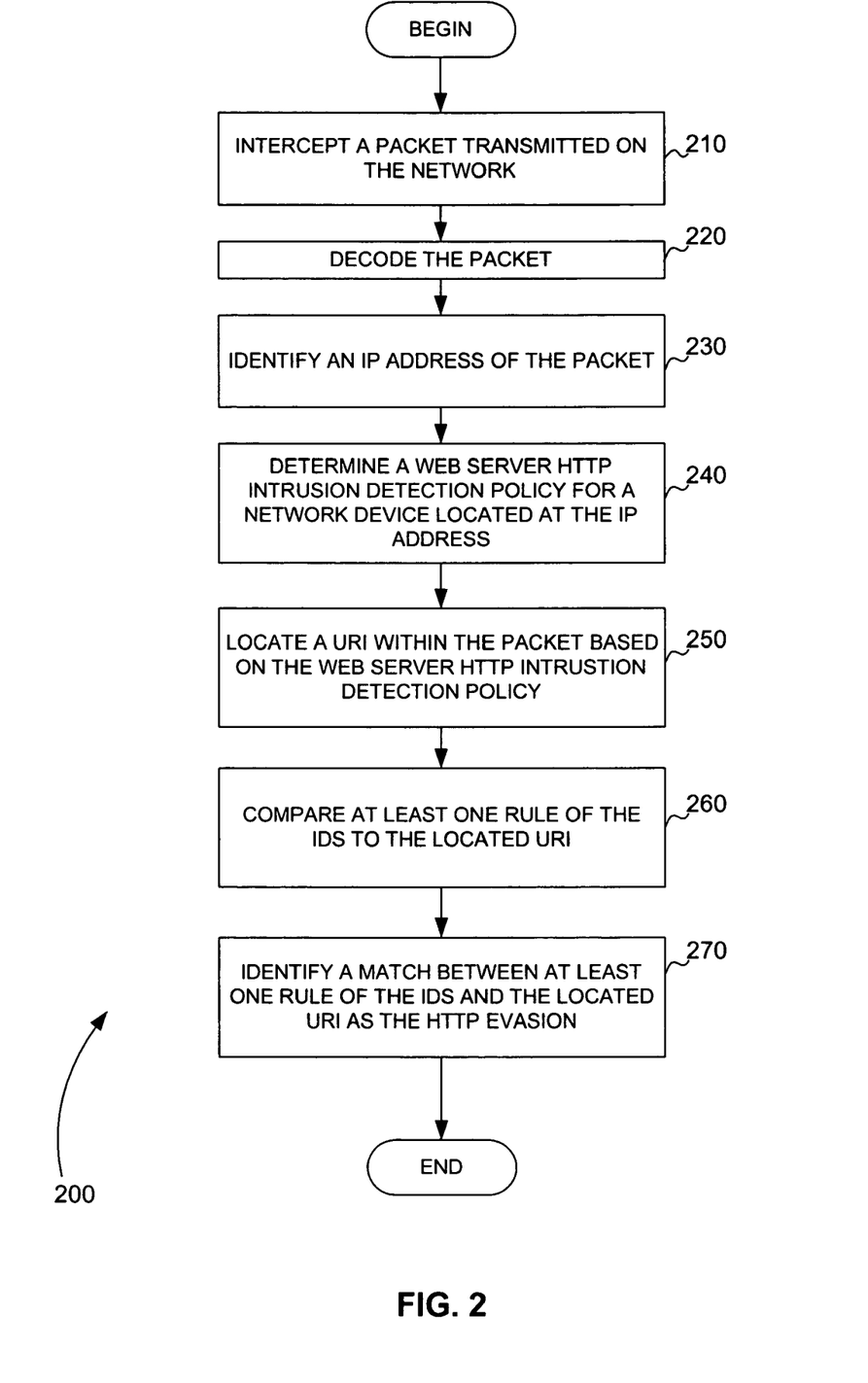
FIG. 2 is a flowchart showing an exemplary method for detecting an HTTP evasion on a network using an IDS, in accordance with an embodiment of the present invention.

FIG. 2 is a flowchart showing an exemplary method 200 for detecting an HTTP evasion on a network using an IDS, in accordance with an embodiment of the present invention.

In step 210 of method 200, a packet transmitted on the network is intercepted. A packet includes an unassembled packet or an assembled packet.

In step 220, the packet is parsed. The IDS parses the packet into network, transport, and application data, for example.

In step 230, an Internet protocol address of the packet is identified.

In step 240, a Web server HTTP intrusion detection policy for a network device located at the Internet protocol address is determined. The Web server HTTP intrusion detection policy includes but is not limited to URI parsing instructions and URI decoding instructions. The network device includes but is not limited to a Web client and a Web server.

In step 250, a UPS is located within the packet based on the Web server HTTP intrusion detection policy. The URI is located using one pass inspection technology that reads through the packet HTTP application data one time. Locating the URI by reading through the packet HTTP application data one time is accomplished through the use of a state machine, for example.

In step 260, at least one pattern from a rule of the IDS is compared to the located URI. One with skill in the art will appreciate that rules-based IDSs contain intrusion detection rules that include patterns to be matched.

In step 270, a match between the pattern from a rule of the IDS and the located URI is identified as the HTTP evasion.

In another embodiment of this method, the Web server HTTP intrusion detection policy for the network device is determined by using the Internet protocol address of the packet as a key to a keyword trie that associates Internet protocol addresses with Web server HTTP intrusion detection policies. The Web server HTTP intrusion detection policy of the network device is the HTTP intrusion detection policy of the IP address found from the packet.

In another embodiment of this method, an obfuscation is decoded within a URI based on the Web server HTTP intrusion detection policy associated with the packet. The obfuscation is decoded using decoding methods including but not limited to hex decoding, double percent hex decoding, double nibble hex decoding, first nibble hex decoding method, second nibble hex decoding, eight bit Unicode transformation format decoding, eight bit Unicode transformation format bare byte decoding, Microsoft™ %U decoding, and mismatch decoding. The obfuscation is decoded using one pass inspection technology that reads through the HTTP application data one time. Decoding the obfuscation by reading through the HTTP application data one time is accomplished through the use of a state machine, for example. The obfuscation is an encoding of a URL field uniquely recognized by a Web server of the network device, for example. At least one pattern from a rule of the IDS is compared to the obfuscation. Finally, a match between the at least one pattern from a rule of the IDS and the obfuscation is identified as the HTTP evasion.

In another embodiment of this method, one or more additional URIs embedded in the packet are identified. At least one pattern from a rule of the IDS is compared to the one or more additional URIs. One or more matches between the at least one pattern from a rule of the IDS and the one or more additional URIs are identified as one or more HTTP evasions.

In another embodiment of this method, a match between a pattern from a rule of the IDS and a URI is recorded.

Figure 3:
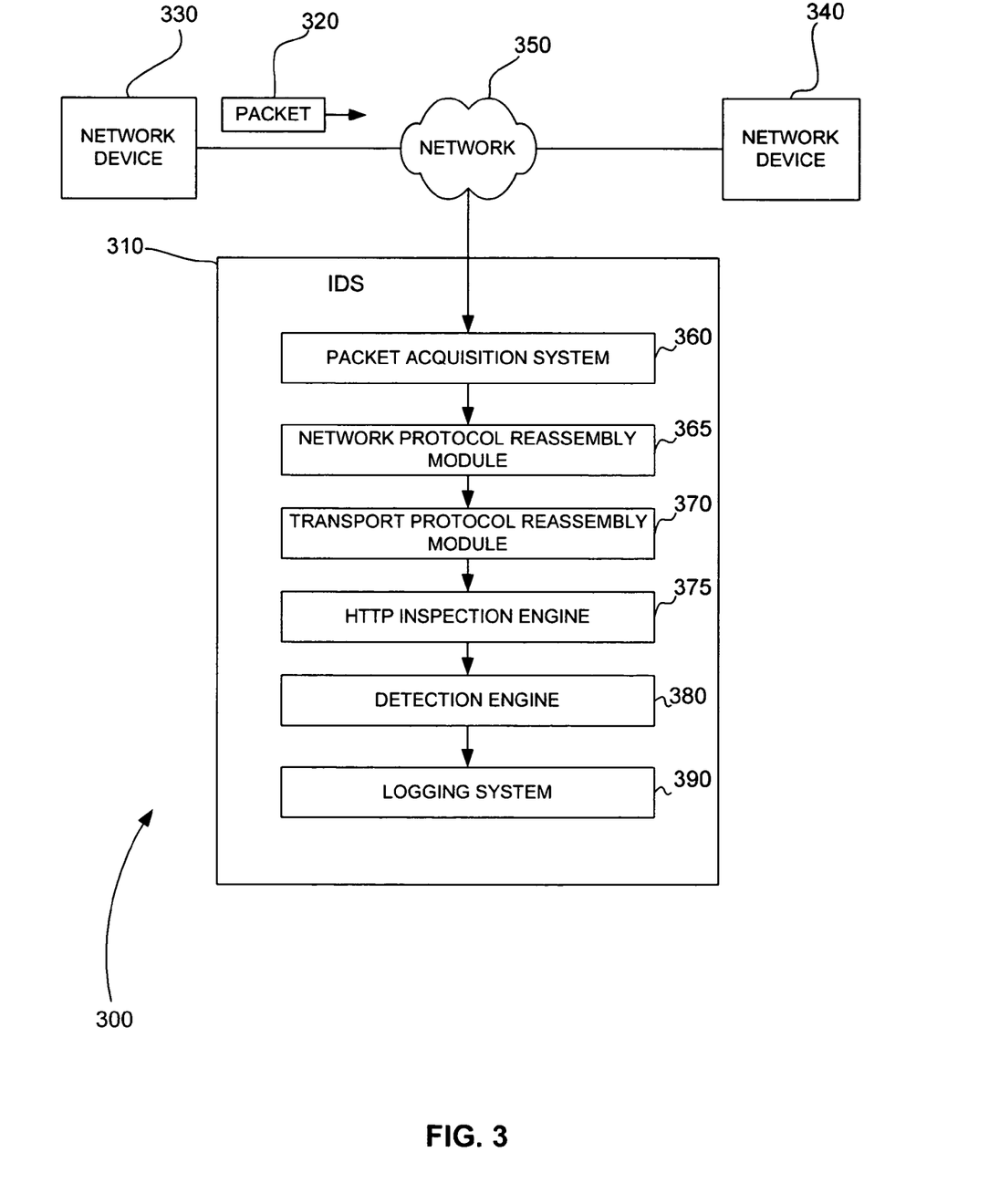
FIG. 3 is a schematic diagram showing the components of an exemplary IDS including an HTTP inspection engine, in accordance with an embodiment of the present invention.

FIG. 3 is a schematic diagram showing the components of an exemplary IDS 310 including an HTTP inspection engine 375, in accordance with an embodiment of the present invention. In system 300, IDS 310 includes packet acquisition system 360, network protocol reassembly module 365, transport protocol reassembly module 370, HTTP inspection engine 375, detection engine 380, and logging system 390. Packet acquisition system 360 intercepts packet 320 transmitted across a network 350 between network device 330 and network device 340 and parses packet 320. Network protocol reassembly module 365 parses network protocols from the packet. Transport protocol reassembly module 370 parses transport protocols from the packet. HTTP inspection engine 375 parses HTTP from the packet, determines a Web server HTTP intrusion detection policy for the packet, parses a URI from the packet based on the Web server HTTP intrusion detection policy, and decodes an obfuscation within the URI based on the Web server HTTP intrusion detection policy. Detection engine 380 receives HTTP inspected packet information from HTTP inspection engine 375 and inspects the HTTP inspected packet information for intrusions. Logging system 390 receives and stores intrusion detection information from detection engine 380.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously improve the ability of an IDS to detect HTTP evasions and attacks. An HTTP policy selection component limits the number of packets that need to be inspected by associating an HTTP intrusion detection policy with a packet. A request URI discovery component locates a URI within a packet using the Web server HTTP intrusion detection policy associated with the packet. A URI normalization module identifies obfuscations within a URI by decoding URL fields according to the Web server HTTP intrusion detection policy associated with the packet.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented hypertext transport protocol inspection engine for decoding an obfuscated universal resource identifier in a communication packet transmitted in a packet network, for use with an intrusion detection system, comprising:

a hypertext transport protocol policy selection component configured to identify a Web server hypertext transport protocol intrusion detection policy associated with a packet, responsive to the packet which is uninspected, so as to determine if the packet is moving to or from a Web server, the hypertext transport protocol policy selection component identifying the Web server hypertext transport protocol intrusion detection policy by using an Internet protocol address obtained from the packet parsed by the intrusion detection system as a key to a keyword trie associating Internet protocol addresses with Web server hypertext transport protocol intrusion detection policies;

a request universal resource identifier discovery component configured to locate a universal resource identifier in the packet based on the Web server hypertext transport protocol intrusion detection policy; and a universal resource identifier normalization module configured to decode an obfuscation within the universal resource identifier after it is located by the request universal resource identifier discovery component.

2. The hypertext transport protocol inspection engine of claim 1, the Web server hypertext transport protocol intrusion detection policy comprising one or more of universal resource identifier parsing instructions and universal resource identifier decoding instructions.

3. The hypertext transport protocol inspection engine of claim 1, the request universal resource identifier discovery component locating the universal resource identifier within the packet parsed by the intrusion detection system based on a Web server hypertext transport protocol intrusion detection policy identified by the hypertext transport protocol policy selection component.

4. The hypertext transport protocol inspection engine of claim 3, the request universal resource identifier discovery component locating the universal resource identifier within the packet parsed by the intrusion detection system by reading through the hypertext transport protocol application data one time.

5. The hypertext transport protocol inspection engine of claim 4, the reading through the hypertext transport protocol application data one time comprising using a state machine.

6. The hypertext transport protocol inspection engine of claim 1, the obfuscation comprising an encoding of a universal resource locator field recognized by a Web server identified by the hypertext transport protocol policy selection component.

7. The hypertext transport protocol inspection engine of claim 1, the universal resource identifier normalization module decoding the obfuscation within the universal resource identifier located by the request universal resource identifier discovery component by one or more of hex decoding, double percent hex decoding, double nibble hex decoding, first nibble hex decoding, second nibble hex decoding, eight bit unicode transformation format decoding, eight bit unicode transformation format bare byte decoding, Microsoft™ %U decoding, and mismatch decoding.

8. The hypertext transport protocol inspection engine of claim 1, the universal resource identifier normalization module decoding the obfuscation within the universal resource identifier located by the request universal resource identifier discovery component by reading through the hypertext transport protocol application data one time.

9. The hypertext transport protocol inspection engine of claim 8, the reading through the hypertext transport protocol application data one time comprising using a state machine.

10. The hypertext transport protocol inspection engine of claim 1, wherein
the request universal resource identifier discovery component is further configured to locate all universal resource identifiers, including the universal resource identifier, within the packet by reading through the entire hypertext transport protocol application data, and
the universal resource identifier normalization module is further configured to decode obfuscations within all of the universal resource identifiers located by the request universal resource identifier discovery component.

11. A method for detecting a hypertext transport protocol evasion on a network using an intrusion detection system, comprising:
intercepting a packet transmitted on the network;
parsing the packet;
identifying an Internet protocol address of the packet;
determining a Web server hypertext transport protocol intrusion detection policy for a network device located at the Internet protocol address, so as to determine if the packet is moving to or from a Web server, wherein determining a Web server hypertext transport protocol intrusion detection policy for a network device comprises using the Internet protocol address as a key to a keyword trie associating Internet protocol addresses with Web server hypertext transport protocol intrusion detection policies;
locating at least one universal resource identifier within the packet based on the Web server hypertext transport protocol intrusion detection policy;
comparing at least one pattern from a rule of the intrusion detection system to the at least one universal resource identifier which was located, to determine if there is a match between the at least one pattern from the rule of the intrusion detection system to the at least one universal resource identifier;
identifying the match as the hypertext transport protocol evasion;
decoding, after the locating, an obfuscation within the at least one universal resource identifier based on the Web server hypertext transport protocol intrusion detection policy;
comparing, after the decoding, the at least one pattern from the rule of the intrusion detection system to the obfuscation which was decoded; and
identifying, after the decoding, a match between the at least one pattern from the rule of the intrusion detection system and the obfuscation which was decoded as the hypertext transport protocol evasion.

12. The method of claim 11, the packet comprising one of an unassembled packet and a reassembled packet.

13. The method of claim 11, the network device comprising one of a Web client and a Web server.

14. The method of claim 11, the Web server hypertext transport protocol intrusion detection policy comprising one or more of universal resource identifier parsing instructions and universal resource identifier decoding instructions.

15. The method of claim 11, further comprising decoding at least one universal resource identifier from the packet by reading through the hypertext transport protocol application data one time.

16. The method of claim 15, the reading through the hypertext transport protocol application data one time comprising using a state machine.

17. The method of claim 11, the obfuscation comprising an encoding of a universal resource locator field recognized by a Web server of the network device.

18. The method of claim 11, the decoding an obfuscation within the at least one universal resource identifier based on the Web server hypertext transport protocol intrusion detection policy comprising one or more of hex decoding, double percent hex decoding, double nibble hex decoding, first nibble hex decoding, second nibble hex decoding, eight bit Unicode transformation format decoding, eight bit Unicode transformation format bare byte decoding, Microsoft™ %U decoding, and mismatch decoding.

19. The method of claim 11, the decoding an obfuscation within the at least one universal resource identifier based on the Web server hypertext transport protocol intrusion detection policy comprising reading through the hypertext transport protocol application data one time.

20. The method of claim 19, the reading through the hypertext transport protocol application data one time comprising using a state machine.

21. The method of claim 11, further comprising:
identifying one or more additional universal resource identifiers embedded in the packet;

comparing at least one pattern from a rule of the intrusion detection system to the one or more additional universal resource identifiers; and identifying one or more matches between the at least one pattern from a rule of the intrusion detection system and the one or more additional universal resources identifiers as one or more hypertext transport protocol evasions.

22. The method of claim 11, further comprising recording the match.

23. An intrusion detection system, comprising:
a packet acquisition system that intercepts a packet transmitted across a network and parses the packet;
a network protocol reassembly module that parses network protocols from the packet;
a transport protocol reassembly module that parses transport protocols from the packet;
a hypertext transport protocol inspection engine that parses hypertext transport protocol from the packet, determines a Web server hypertext transport protocol intrusion detection policy for the packet so as to determine if the packet is moving to or from a Web server, wherein determining a Web server hypertext transport protocol intrusion detection policy comprises using the Internet protocol address as a key to a keyword trie associating Internet protocol addresses with Web server hypertext transport protocol intrusion detection policies, locates at least one universal resource identifier from the packet based on the Web server hypertext transport protocol intrusion detection policy, and decodes an obfuscation within the at least one universal resource identifier based on the Web server hypertext transport protocol intrusion detection policy after the universal resource identifier is located;
a detection engine that receives hypertext transport protocol inspected packet information from the hypertext transport protocol inspection engine and inspects the hypertext transport protocol inspected packet information for intrusions; and
a logging system that receives and stores information about the intrusions from the detection engine.

* * * * *